US011804949B2

United States Patent
Khoury et al.

(10) Patent No.: US 11,804,949 B2
(45) Date of Patent: Oct. 31, 2023

(54) SUBSCRIBER REVOCATION IN A PUBLISH-SUBSCRIBE NETWORK USING ATTRIBUTE-BASED ENCRYPTION

(71) Applicant: Raytheon BBN Technologies Corp., Cambridge, MA (US)

(72) Inventors: Joud Khoury, Boston, MA (US); Samuel Cunningham Nelson, Sudbury, MA (US); William Timothy Strayer, West Newton, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 21 days.

(21) Appl. No.: 17/207,031

(22) Filed: Mar. 19, 2021

(65) Prior Publication Data
US 2022/0303115 A1    Sep. 22, 2022

(51) Int. Cl.
*H04L 9/06* (2006.01)
*H04L 9/08* (2006.01)
(Continued)

(52) U.S. Cl.
CPC ........ *H04L 9/0618* (2013.01); *G06F 16/2246* (2019.01); *H04L 9/0861* (2013.01); *H04L 9/0891* (2013.01); *H04L 9/14* (2013.01)

(58) Field of Classification Search
CPC ....... H04L 9/0618; H04L 9/0861; H04L 9/14; G06F 16/2246
See application file for complete search history.

(56) References Cited

U.S. PATENT DOCUMENTS 10,931,651 B2 * 2/2021 Du ...................... H04L 9/0643
11,558,185 B2   1/2023 Khoury et al.
(Continued)

FOREIGN PATENT DOCUMENTS

CN   105592100 A  *  5/2016
CN   105592100 A     5/2016
(Continued)

OTHER PUBLICATIONS

ETSI Technical Committee Cyber Security (CYBER), "Application of Attribute Based Encryption (ABE) for PII and personal data protection on IoT devices, WLAN, cloud and mobile services—High level requirements," ETSI TS 103 458, 2018, V1.1.1.
(Continued)

*Primary Examiner* — Darshan I Dhruv
(74) *Attorney, Agent, or Firm* — Lando & Anastasi, LLP (57) ABSTRACT

Techniques for subscriber revocation in a publish-subscribe network using attribute-based encryption (ABE) are disclosed, including: generating a tree data structure including leaf nodes representing subscribers, subtrees of the tree data structure representing subsets of subscribers having different likelihoods of ABE key revocation; generating ABE keys associated with edges in the tree data structure; assigning ABE keys to the leaf nodes, each leaf node being assigned a subset of the ABE keys associated with edges that form a path from a root node to the leaf node; based at least on a revocation record that indicates one or more revoked subscribers, determining a minimal subset of ABE keys that covers all non-revoked subscribers; and encrypting a payload using an encryption policy requiring at least one ABE key in the minimal subset of the ABE keys, to obtain a ciphertext that is not accessible to the one or more revoked subscribers.

17 Claims, 5 Drawing Sheets

(51) Int. Cl.
*H04L 9/14* (2006.01)
*G06F 16/22* (2019.01)

(56) References Cited

U.S. PATENT DOCUMENTS

| | | | | |
|---|---|---|---|---|
| 2002/0147906 | A1* | 10/2002 | Lotspiech | H04L 9/0836 |
| | | | | 713/158 |
| 2003/0140227 | A1* | 7/2003 | Asano | H04L 9/0891 |
| | | | | 713/157 |
| 2008/0192939 | A1* | 8/2008 | Lotspiech | H04L 63/0428 |
| | | | | 380/279 |
| 2011/0099362 | A1* | 4/2011 | Haga | H04L 9/0897 |
| | | | | 380/284 |
| 2011/0320809 | A1* | 12/2011 | Amendola | H04L 9/0891 |
| | | | | 713/158 |
| 2016/0014095 | A1* | 1/2016 | Strayer | H04L 63/20 |
| | | | | 713/168 |
| 2021/0135864 | A1* | 5/2021 | Salmela | H04L 9/3247 |
| 2022/0052835 | A1* | 2/2022 | Eldefrawy | H04L 9/0825 |

FOREIGN PATENT DOCUMENTS

| | | | | |
|---|---|---|---|---|
| CN | 107566386 | A * | 1/2018 | |
| CN | 107566386 | A | 1/2018 | |
| CN | 108989026 | A * | 12/2018 | H04L 9/0822 |
| CN | 108989026 | A | 12/2018 | |
| WO | 2010024931 | A1 | 3/2010 | |
| WO | WO-2010024931 | A1 * | 3/2010 | G06F 17/30327 |
| WO | 2013131244 | A1 | 9/2013 | |
| WO | WO-2013131244 | A1 * | 9/2013 | G06F 21/6218 |
| WO | 2014028039 | A1 | 2/2014 | |
| WO | WO-2014028039 | A1 * | 2/2014 | G06F 16/152 |
| WO | 2014059622 | A1 | 4/2014 | |
| WO | WO-2014059622 | A1 * | 4/2014 | H04L 63/0428 |
| WO | 2016014079 | A1 | 1/2016 | |
| WO | WO-2016014079 | A1 * | 1/2016 | G06F 17/30327 |

OTHER PUBLICATIONS

ETSI Technical Committee Cyber Security (CYBER), "Attribute Based Encryption for Attribute Based Access Control," ETSI TS 103 531, 2018, V1.1.1.

Kumar, S., et al., "JEDI: Many-to-Many End-to-End Encryption and Key Delegation for IoT," Proceedings of the 28th USENIX Security Symposium, 2019, pp. 1519-1536.

Naor, D., et al., "Revocation and Tracing Schemes for Stateless Receivers," 2001, pp. 1-34.

* cited by examiner

SUBSCRIBER REVOCATION IN A PUBLISH-SUBSCRIBE NETWORK USING ATTRIBUTE-BASED ENCRYPTION

STATEMENT REGARDING FEDERALLY-SPONSORED RESEARCH OR DEVELOPMENT

This application was made with government support. The U.S. Government has certain rights in this invention.

BACKGROUND

Attribute-based encryption (ABE) is an encryption technique in which a payload is encrypted to require a recipient to possess one or more "attributes." The set of attributes required to decrypt the payload is referred to as an ABE policy. To decrypt the payload, a recipient must possess the ABE key(s) corresponding to the attribute(s) required by the ABE policy.

While using ABE, it may be necessary to revoke a recipient, i.e., prevent that recipient from decrypting future payloads encrypted under a particular ABE policy. Revocation is typically achieved using time-limited ABE keys. A recipient's ABE keys are valid only for a certain period of time, after which the recipient must refresh its ABE keys. If the recipient has been revoked, then it will not receive refreshed ABE keys. Time-based revocation incurs network and processing costs associated with refreshing ABE keys, and does not allow for immediate revocation. A recipient can still decrypt payloads encrypted under an ABE policy matching the recipient's attributes until the recipient's ABE keys have expired.

Alternatively, a trusted proxy between the sender and the recipient may handle revocation. A decryption key may be split into two or more components, at least one of which is stored at the proxy. The proxy may keep track of revoked attributes and deliver its decryption key component(s) to a recipient only if the recipient is not revoked, thus allowing for immediate online revocation. However, this approach raises performance concerns (e.g., because ciphertexts are not self-secured and decryption requires communication with the proxy) and security concerns (e.g., because the proxy must be trusted).

Ciphertext expansion refers to the size increase (e.g., measured in bytes) of a payload when it is encrypted. The additional size is attributable to the inclusion of information needed to decrypt the payload. For example, when encrypting a payload under an ABE policy, each attribute enumerated in the ABE policy increases ciphertext expansion for that payload.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to attribute-based encryption (ABE).

SUMMARY

In general, in one aspect, one or more non-transitory machine-readable media store instructions that, when executed by one or more processors, cause the one or more processors to perform operations including: generating a tree data structure including leaf nodes representing subscribers in a publish-subscribe network that uses attribute-based encryption (ABE), subtrees of the tree data structure representing respective subsets of the subscribers having different likelihoods of ABE key revocation; generating ABE keys associated with edges in the tree data structure; assigning the ABE keys to the leaf nodes, each respective leaf node being assigned a subset of the ABE keys associated with a subset of the edges that forms a path from a root node of the tree data structure to the respective leaf node; based at least on a revocation record that indicates one or more revoked subscribers, determining a minimal subset of the ABE keys that covers all non-revoked subscribers; and encrypting a payload using an encryption policy requiring at least one ABE key in the minimal subset of the ABE keys, to obtain a ciphertext that is not accessible to the one or more revoked subscribers.

The subtrees of the tree data structure may include at least a first subtree representing a first subset of subscribers having a first likelihood of ABE key revocation and a second subtree representing a second subset of subscribers having a second likelihood of ABE key revocation that is greater than the first likelihood, and the tree data structure and ABE keys being structured so that revocation of any subscriber represented by the first subtree requires greater ciphertext expansion than revocation of any subscriber represented by the second subtree. Each subscriber represented by the second subtree may be assigned one or more ABE keys indicating non-identity with every other subscriber represented by the second subtree. The subtrees of the tree data structure may further include a third subtree representing a third subset of subscribers having a third likelihood of ABE key revocation that is greater than the first likelihood and less than the second likelihood, and the tree data structure and ABE keys being further configured so that revocation of any subscriber represented by the third subtree requires greater ciphertext expansion than revocation of any subscriber represented by the second subtree and less ciphertext expansion than revocation of any subscriber represented by the first subtree.

The operations may further include: subscribing to a revocation channel in the publish-subscribe network; receiving, via the revocation channel, an instruction to revoke a particular subscriber in the plurality of subscribers; and updating the revocation record to identify the particular subscriber as revoked.

The operations may further include: receiving, responsive to publishing the ciphertext in the publish-subscribe network, a message indicating that the ciphertext is accessible to a revoked subscriber not indicated in the revocation record; and responsive to the message indicating that the revocation record is accessible to a revoked subscriber, re-encrypting the payload to obtain an updated ciphertext that is not accessible to the revoked subscriber.

The encryption policy may further require one or more ABE keys that excludes at least one of the non-revoked subscribers.

In general, in one aspect, a device includes: one or more processors; and one or more non-transitory machine-readable media storing instructions. The instructions, when executed by the one or more processors, cause the one or more processors to perform operations including: generating a tree data structure including leaf nodes representing subscribers in a publish-subscribe network that uses attribute-based encryption (ABE), subtrees of the tree data structure representing respective subsets of the subscribers having different likelihoods of ABE key revocation; generating ABE keys associated with edges in the tree data structure; assigning the ABE keys to the leaf nodes, each respective leaf node being assigned a subset of the ABE keys associated with a subset of the edges that forms a path from a root node of the tree data structure to the respective leaf node; based at least on a revocation record that indicates one or more revoked subscribers, determining a minimal subset of the ABE keys that covers all non-revoked subscribers; and encrypting a payload using an encryption policy requiring at least one ABE key in the minimal subset of the ABE keys, to obtain a ciphertext that is not accessible to the one or more revoked subscribers.

The subtrees of the tree data structure may include at least a first subtree representing a first subset of subscribers having a first likelihood of ABE key revocation and a second subtree representing a second subset of subscribers having a second likelihood of ABE key revocation that is greater than the first likelihood, and the tree data structure and ABE keys being structured so that revocation of any subscriber represented by the first subtree requires greater ciphertext expansion than revocation of any subscriber represented by the second subtree. Each subscriber represented by the second subtree may be assigned one or more ABE keys indicating non-identity with every other subscriber represented by the second subtree. The subtrees of the tree data structure may further include a third subtree representing a third subset of subscribers having a third likelihood of ABE key revocation that is greater than the first likelihood and less than the second likelihood, and the tree data structure and ABE keys being further configured so that revocation of any subscriber represented by the third subtree requires greater ciphertext expansion than revocation of any subscriber represented by the second subtree and less ciphertext expansion than revocation of any subscriber represented by the first subtree.

The operations may further include: subscribing to a revocation channel in the publish-subscribe network; receiving, via the revocation channel, an instruction to revoke a particular subscriber in the plurality of subscribers; and updating the revocation record to identify the particular subscriber as revoked.

The operations may further include: receiving, responsive to publishing the ciphertext in the publish-subscribe network, a message indicating that the ciphertext is accessible to a revoked subscriber not indicated in the revocation record; and responsive to the message indicating that the revocation record is accessible to a revoked subscriber, re-encrypting the payload to obtain an updated ciphertext that is not accessible to the revoked subscriber.

The encryption policy may further require one or more ABE keys that excludes at least one of the non-revoked subscribers.

In general, in one aspect, a method includes: generating a tree data structure including leaf nodes representing subscribers in a publish-subscribe network that uses attribute-based encryption (ABE), subtrees of the tree data structure representing respective subsets of the subscribers having different likelihoods of ABE key revocation; generating ABE keys associated with edges in the tree data structure; assigning the ABE keys to the leaf nodes, each respective leaf node being assigned a subset of the ABE keys associated with a subset of the edges that forms a path from a root node of the tree data structure to the respective leaf node; based at least on a revocation record that indicates one or more revoked subscribers, determining a minimal subset of the ABE keys that covers all non-revoked subscribers; and encrypting a payload using an encryption policy requiring at least one ABE key in the minimal subset of the ABE keys, to obtain a ciphertext that is not accessible to the one or more revoked subscribers.

The subtrees of the tree data structure may include at least a first subtree representing a first subset of subscribers having a first likelihood of ABE key revocation and a second subtree representing a second subset of subscribers having a second likelihood of ABE key revocation that is greater than the first likelihood, and the tree data structure and ABE keys being structured so that revocation of any subscriber represented by the first subtree requires greater ciphertext expansion than revocation of any subscriber represented by the second subtree. Each subscriber represented by the second subtree may be assigned one or more ABE keys indicating non-identity with every other subscriber represented by the second subtree. The subtrees of the tree data structure may further include a third subtree representing a third subset of subscribers having a third likelihood of ABE key revocation that is greater than the first likelihood and less than the second likelihood, and the tree data structure and ABE keys being further configured so that revocation of any subscriber represented by the third subtree requires greater ciphertext expansion than revocation of any subscriber represented by the second subtree and less ciphertext expansion than revocation of any subscriber represented by the first subtree.

The method may further include: subscribing to a revocation channel in the publish-subscribe network; receiving, via the revocation channel, an instruction to revoke a particular subscriber in the plurality of subscribers; and updating the revocation record to identify the particular subscriber as revoked.

The method may further include: receiving, responsive to publishing the ciphertext in the publish-subscribe network, a message indicating that the ciphertext is accessible to a revoked subscriber not indicated in the revocation record; and responsive to the message indicating that the revocation record is accessible to a revoked subscriber, re-encrypting the payload to obtain an updated ciphertext that is not accessible to the revoked subscriber.

The encryption policy may further require one or more ABE keys that excludes at least one of the non-revoked subscribers.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

I. System Architecture

Figure 1:
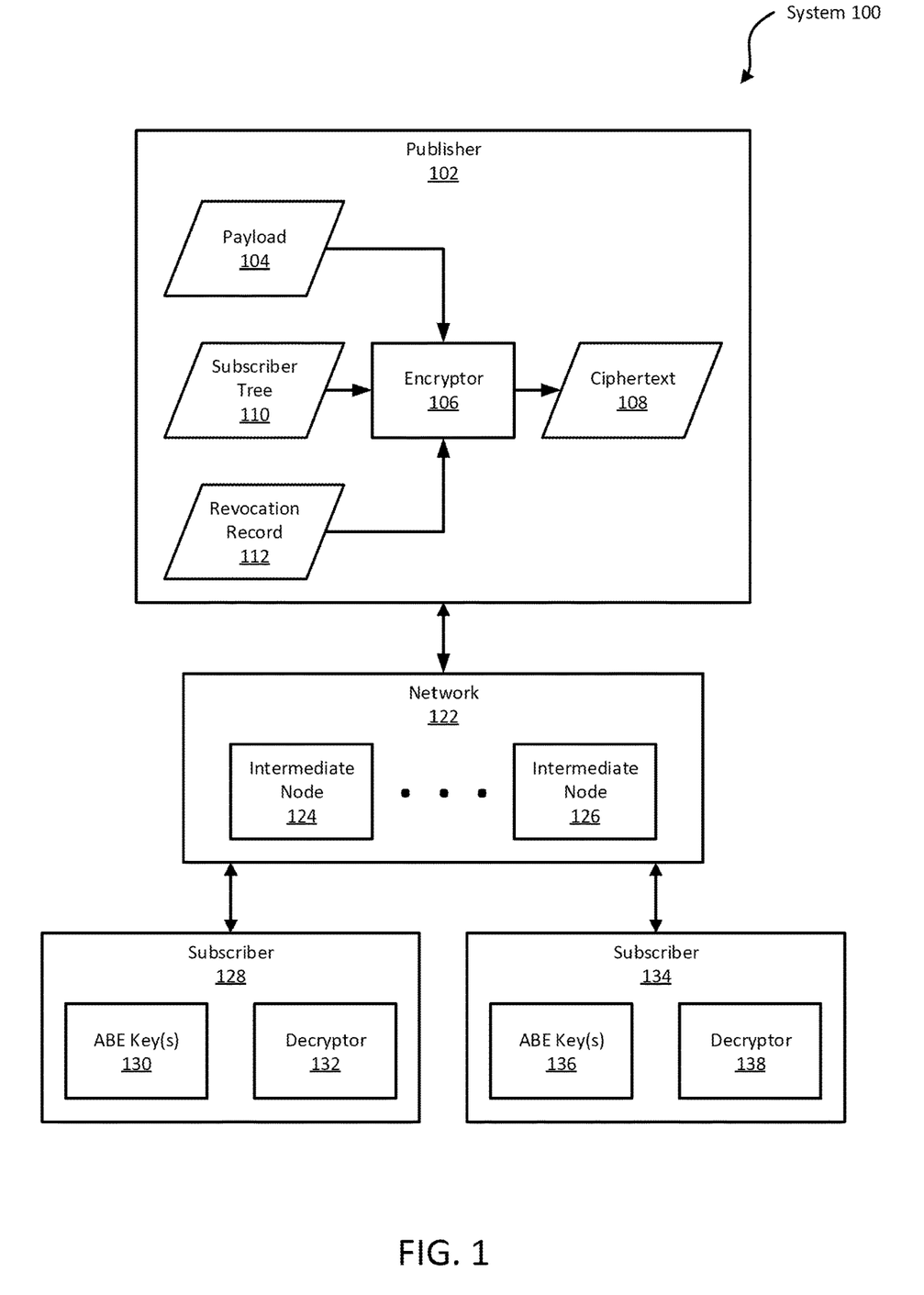
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, a publisher 102 is configured to publish one or more payloads (e.g., payload 104) to one or more subscribers over a network 122 (e.g., via one or more intermediate nodes 124, 126). Specifically, the publisher 102 includes an encryptor 106 that is configured to generate a ciphertext 108 for publication, using an ABE policy that matches only the authorized subscriber(s). In this example, there are two subscribers: subscriber 128 and subscriber 134. The publisher 102 and subscribers 128, 134 are nodes in a publish-subscribe network where the publisher 102 knows which specific subscriber(s) is/are to receive the payload 104. At a high level, a publish-subscribe network may be classified as enterprise or tactical, and may be centralized or distributed. Examples of enterprise centralized publish-subscribe networks include, but are not limited to: Apache ActiveMQ®, MQTT for the Internet of Things (IoT), and general enterprise service buses. Examples of tactical decentralized publish-subscribe networks include, but are not limited to: Dynamo/Robust Information Provisioning Layer (RIPL) (developed by Raytheon BBN Technologies Corp.) and Named Data Networking (NDN). Knowledge of the specific target subscriber(s) allows the publisher 102 to revoke a given subscriber quickly, without requiring the subscriber's ABE key(s) to expire, as described in further detail herein.

In the examples described herein, a payload 104 is assumed to be a single packet. Alternatively or additionally, techniques described herein may be applied to different units of payload. The publisher 102 may obtain the payload 104 from a sensor (e.g., an image sensor, video sensor, global positioning system (GPS), and/or another kind of sensor) or from another source. The publisher 102 may generate the payload 104 itself or obtain the payload 104 from another node (not shown).

In an embodiment, the publisher 102 is configured to generate a subscriber tree 110. Alternatively, another node in the publish-subscribe network may generate the subscriber tree 110 and transmit the publish-subscribe tree 110 to the publisher 102. For example, another node in the system 100 that is authorized to perform revocations may generate the subscriber tree 110 and disseminate the subscriber tree 110 to the publisher 102. The subscriber tree 110 is a tree data structure that represents subscribers in the publish-subscribe network. The subscriber tree 110 may be a binary tree, another kind of n-ary tree, or another kind of tree data structure. In an embodiment, leaf nodes of the subscriber tree 110 represent individual subscribers. The subscriber tree 110 may include two or more subtrees that represent subsets of the subscribers having different likelihoods (e.g., specific likelihoods or ranges thereof) of revocation. For example, one subtree may represent subscribers having high likelihood of revocation and another subtree may represent subscribers having low likelihood of revocation. Any number of subtrees may be used to designate any number of different likelihoods of revocation. The likelihood of revocation for a given subscriber may be determined by a subject matter expert, by an automated computer process, and/or based on one or more properties of the subscriber. For example, in a military environment, subscribers in an untrusted subnetwork at the tactical edge may have a higher likelihood of revocation than subscribers in a trusted subnetwork at a secure location. Examples of operations for generating the subscriber tree 110 are discussed below.

The publisher 102 is further configured to store a revocation record 112, which, in one embodiment, is a data structure that indicates which subscriber(s), if any, is/are revoked. For example, the revocation record 112 may be a list, table, database, or other kind of record. For a given revoked subscriber, information stored in a revocation record 112 may include one or more of: an identifier of the revoked subscriber; a timestamp of the time when the revocation decision was made; a date and/or time when the revocation should become effective; a signature; and/or other information associated with subscriber revocation. In an embodiment, another node in the system 100 may be authorized to perform revocations, and may be configured to disseminate (e.g., to the publisher 102 and/or one or more other nodes) authentic records corresponding to revocations. The node may disseminate the authentic records as a revocation record 112 and/or as information for the publisher 102 to store in a revocation record 112. In an embodiment, the encryptor 106 is configured to encrypt the payload 104 using an ABE policy that is based at least on the subscriber tree 110 and revocation record 112, so that the resulting ciphertext 108 is accessible to the target subscriber(s) and not accessible to any revoked subscriber(s). As used herein, "accessible" means "permissibly decryptable." The ciphertext 108 being inaccessible to a revoked subscriber does not preclude the possibility that the revoked subscriber might nonetheless attempt to circumvent the ABE policy to extract the payload 104 from the ciphertext 108.

As illustrated in FIG. 1, each subscriber stores one or more ABE keys (e.g., ABE keys 130, 136). Each subscriber further includes a decryptor (e.g., decryptors 132, 138) configured to decrypt ciphertexts. For example, decryptor 132 can decrypt the ciphertext 108 only if the ABE key(s) 130 stored by subscriber 138 satisfy the ABE policy used to encrypt the payload 104, and decryptor 138 can decrypt the ciphertext 108 only if the ABE key(s) 136 stored by subscriber 134 satisfy the ABE policy.

One or more intermediate nodes (e.g., intermediate nodes 124, 126) in the network 122 may also be configured to store revocation records (not shown). In general, records of which subscriber(s) is/are revoked may be disseminated through the network 122, e.g. via a revocation channel, so that multiple nodes are aware of the revocation(s). Due to differences in propagation times through the network 122 and/or other possible connectivity or publish/subscribe issues that could prevent a node from updating its revocation record, a revocation record stored by one node may be more up-to-date than a revocation record stored by another node. One or more intermediate nodes (i.e., nodes forwarding data from a publisher to one or more subscribers) may be configured to validate encrypted traffic against their own revocation records, to avoid forwarding ciphertexts that would be accessible to a revoked subscriber.

For example, an intermediate node 124 may store a revocation record (not shown) that is more current than the revocation record 112 stored by the publisher 102. In this example, before forwarding the ciphertext 108, the intermediate node 124 may be configured to verify that the ciphertext 108 is not accessible to a subscriber that the intermediate node 124 recognizes as revoked based on its own revocation record. If the intermediate node 124 determines that the ciphertext 108 is accessible to one or more revoked subscribers, the intermediate node 124 may decline to forward the ciphertext 108. The intermediate node 124 may transmit a message to the publisher 102 indicating that the payload 104 needs to be re-encrypted to be inaccessible to the revoked subscriber(s). The message may include information about the revoked subscriber(s). For example, the message may include a copy of some or all of the intermediate node 124's revocation record. Responsive to the message from the intermediate node 124, the publisher 102 may be configured to re-encrypt the payload 104, to obtain an updated ciphertext 108 that is not accessible to the revoked subscriber(s). The relatively small cost of validating the ciphertext 108 at the intermediate node 124 may thus help ensure that revocations are effective as quickly as possible, even if the publisher 102's revocation record 112 is not yet up to date.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

II. Example Operations for Generating a Subscriber Tree

Figure 2:
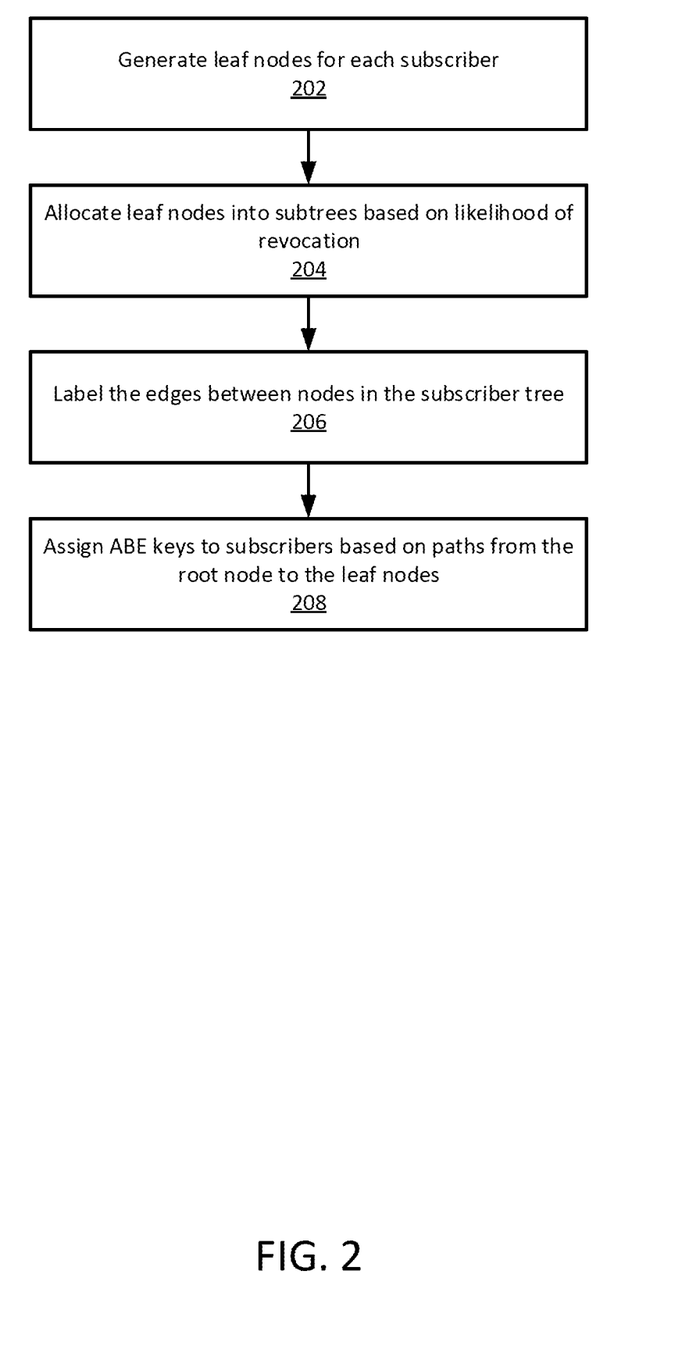
FIG. 2 is a flow diagram of an example of operations for generating a subscriber tree according to an embodiment.

FIG. 2 is a flow diagram of an example of operations for generating a subscriber tree according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., one or more components of the system 100 illustrated in FIG. 1) generates leaf nodes for each subscriber in the publish-subscribe network (Operation 202). The system may generate leaf nodes for each subscriber that already exists in the network. Alternatively or additionally, the system may generate leaf nodes up to a maximum number of supported subscribers, even if that number of subscribers does not already exist in the network.

The system allocates the leaf nodes into two or more subtrees, based on the subscribers' likelihood of revocation (Operation 204). For example, when generating a subscriber tree with n leaf nodes (i.e., supporting n current or possible subscribers), the system may allocate the leaf nodes into three subtrees, each containing n/3 leaf nodes. One subtree may represent subscribers having a low likelihood of revocation, another subtree may represent subscribers having a medium likelihood of revocation, and yet another subtree may represent subscribers having a high likelihood of revocation. Alternatively, a different number of subtrees may be used, and/or the system may allocate unequal numbers of leaf nodes to each subtree. For example, in some environments, most subscribers are expected to have a high likelihood of revocation. In some other environments, most subscribers are expected to have a low likelihood of revocation. Embodiments should not be considered limited to any particular number of subtrees and/or allocation of leaf nodes between the subtrees.

In an embodiment, the system labels the edges between nodes in the subscriber tree (Operation 206). For example, in a binary tree or subtree, two edges extending from a parent node may be labeled "0" and "1," respectively. Four edges extending from a parent node may be labeled "00," "01," "10," and "11," respectively. Different labeling schemas may be used, and embodiments should not be considered limited to a particular labeling schema. The system may further label each child node (i.e., each node other than the root node) in the subscriber tree based on a concatenation the labels of the edges extending from the root node to that child node.

As discussed above, leaf nodes in the subscriber tree represent subscribers. For each leaf node representing a subscriber, the system assigns ABE keys to that subscriber based on a path from the root node to the leaf node (Operation 208). Specifically, when the path follows multiple edges, the ABE keys may correspond to concatenations of edge labels at each step along the path. For example, if the path to a leaf node representing a subscriber traverses edges labeled "0," "1," and "1," then the subscriber may be assigned ABE keys corresponding to the labels "0," "01," and "011." In this manner, the subscriber is effectively assigned labels corresponding recursively to each subtree to which the subscriber's leaf node belongs. As described below, this recursive labeling and assignment of ABE keys allows the system to determine a minimal subset of ABE keys that covers non-revoked subscribers, without needing to enumerate ABE keys for each individual subscriber.

In the examples discussed herein, leaf nodes are assumed to represent subscribers. One or more nodes that represent subscribers may also have one or more respective child nodes. For example, a node that represents a subscriber may have one or more child nodes describing properties of that subscriber. In such examples, a hierarchy of two more nodes that only includes information uniquely associated with a single subscriber may be considered, collectively, a "leaf node" without departing from the general approach described herein.

III. Example Subscriber Tree

Figure 3:
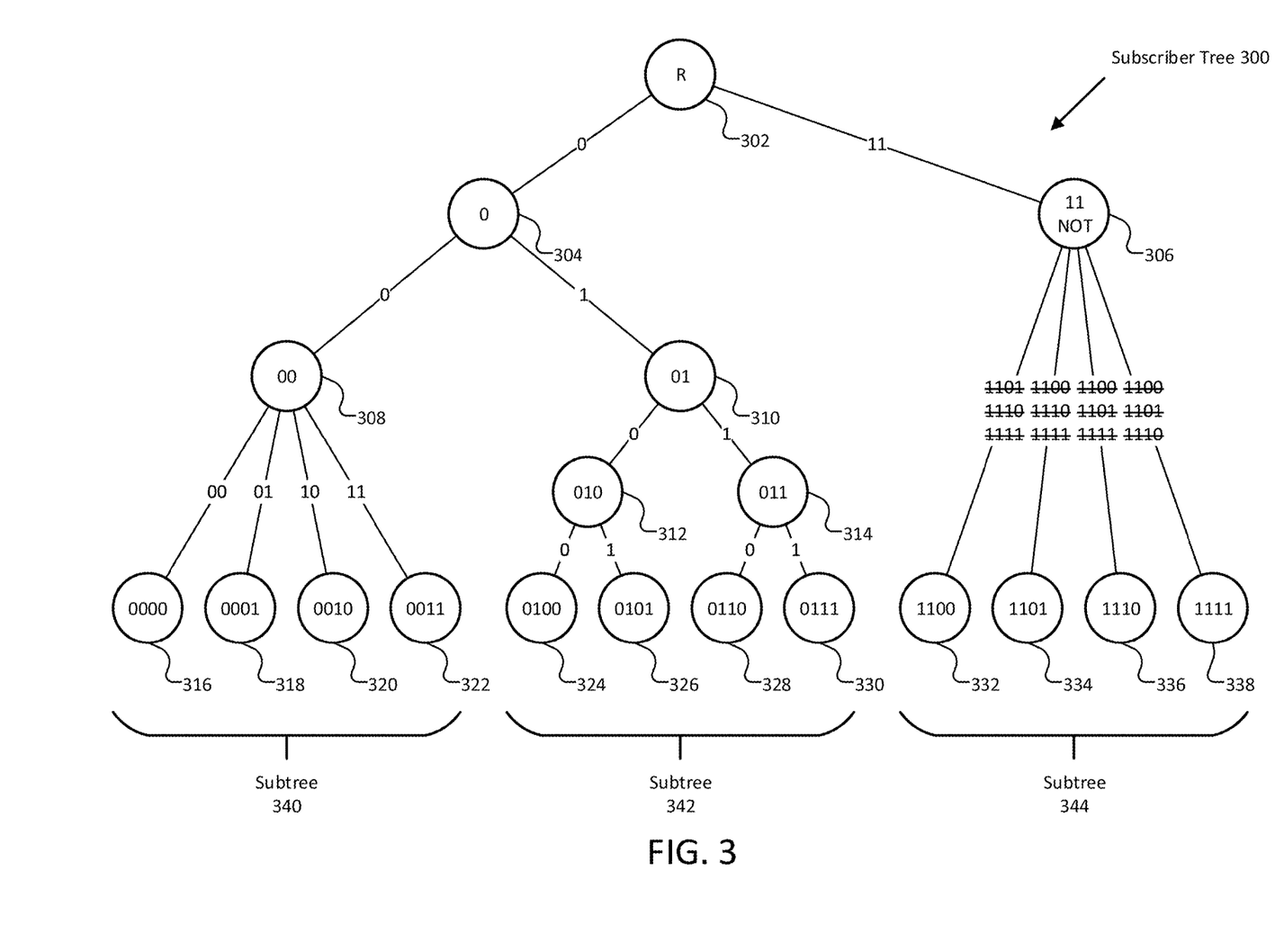
FIG. 3 is a block diagram of an example of a subscriber tree according to an embodiment.

FIG. 3 is a block diagram of an example of a subscriber tree according to an embodiment. The example illustrated in FIG. 3 is provided for purposes of clarity. Components and/or operations described in this example may not be applicable to one or more embodiments. Accordingly, components and/or operations described in this example should not be construed as limiting the scope of one or more embodiments.

FIG. 3 illustrates an example of a subscriber tree 300 having three subtrees 340, 342, 344 representing three subsets of a total set of twelve subscribers. The twelve subscribers may be actual subscribers and/or may represent a maximum number of subscribers supported by the subscriber tree 300. In this example, each subtree has four leaf nodes representing four subscribers, respectively. Subtree 340 (with leaf nodes having a category prefix "00") represents subscribers having a low likelihood of revocation, subtree 342 (with leaf nodes having a category prefix "10") represents subscribers having a medium likelihood of revocation, and subtree 344 (with leaf nodes having a category prefix "11") represents subscribers having a high likelihood of revocation. Nodes 304, 306, 308, 310, 312, and 314 are intermediate nodes that define the structure of the subscriber tree 300 and its subtrees 340, 342, 344. Intermediate node 306 is a negation node, where each edge node extending from the node 306 is labeled with a negation of the labels that would otherwise be assigned to the other edges extending from the node 306. The subscribers associated with each leaf node are assigned ABE keys based on the recursive concatenation of edges extending from a root node 302 to each respective leaf node, as follows (where strikethrough means "not," as directed by the negation node 306):

TABLE 1

ABE KEYS ASSIGNED TO SUBSCRIBERS IN FIG. 3

| Node | Likelihood of Revocation | ABE Keys |
|---|---|---|
| 316 | Low | 0, 00, 0000 |
| 318 | Low | 0, 00, 0001 |
| 320 | Low | 0, 00, 0010 |
| 322 | Low | 0, 00, 0011 |
| 324 | Medium | 0, 01, 010, 0100 |
| 326 | Medium | 0, 01, 010, 0101 |
| 328 | Medium | 0, 01, 011, 0110 |
| 330 | Medium | 0, 01, 011, 0111 |
| 332 | High | 11, ~~1101~~, ~~1110~~, ~~1111~~ |
| 334 | High | 11, ~~1100~~, ~~1110~~, ~~1111~~ |
| 336 | High | 11, ~~1100~~, ~~1101~~, ~~1111~~ |
| 338 | High | 11, ~~1100~~, ~~1101~~, ~~1110~~ |

As illustrated in FIG. 3 and Table 1, the subtrees are configured and ABE keys are assigned so that ABE key storage (offline cost) differs between the subsets of subscribers, with the subscribers having the lowest likelihood of revocation carrying the lowest offline cost and the subscribers having the highest likelihood of revocation carrying the highest offline cost. Conversely, as described in further detail below, the ciphertext expansion (online cost) to revoke a subscriber is highest for the lowest-likelihood subset of subscribers and lowest for the highest-likelihood subset of subscribers. Thus, this approach balances offline costs and online costs, in favor of lower online costs when a subscriber is revoked.

IV. Example Operations for Subscriber Revocation

Figure 4:
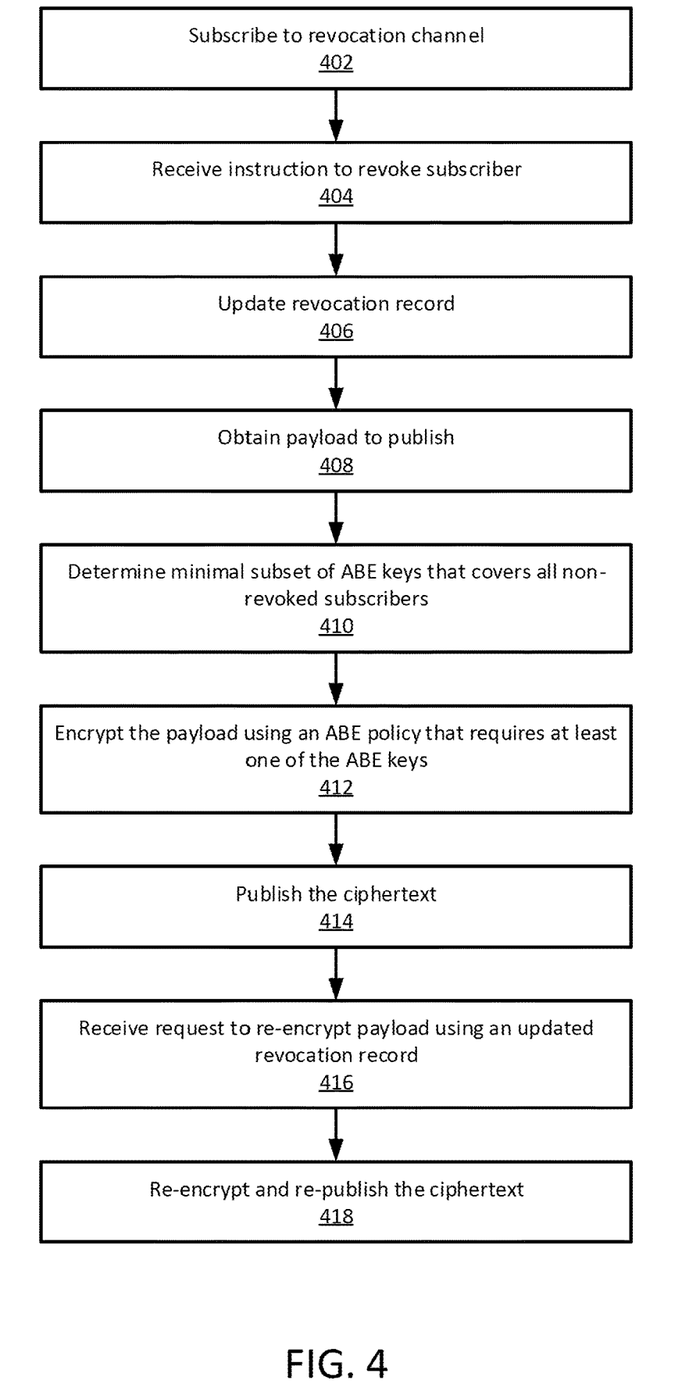
FIG. 4 is a flow diagram of an example of operations for subscriber revocation according to an embodiment.

FIG. 4 is a flow diagram of an example of operations for subscriber revocation according to an embodiment. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a publisher in a publish-subscribe network subscribes to a revocation channel (Operation 402). The revocation channel is a subscription channel for receiving subscriber revocation instructions from one or more nodes having an authority-to-revoke ("ATR") attribute. When an authorized node learns that a subscriber should be revoked, it generates and publishes a message to the revocation channel indicating that the subscriber should be revoked. For security purposes to avoid unauthorized revocations, the authorized node may sign the message with the "ATR" attribute. The publisher receives the instruction via the revocation channel (Operation 404).

Responsive to receiving a revocation instruction, the publisher may update a revocation record (Operation 406). The revocation record indicates which subscriber(s), if any, is/are revoked. When the publisher receives a payload to publish (Operation 408), the publisher uses a subscriber tree (generated as described herein) and the revocation record to determine the minimal subset of ABE keys that covers all non-revoked subscribers (Operation 410). The publisher encrypts the payload using an ABE policy that requires at least one of the ABE keys in the minimal subset of authorized ABE keys (Operation 412). The ABE policy may also include one or more other access policies that limit access to a subset of the non-revoked subscribers. For example, given a set of non-revoked subscribers A, B, C, and D, a payload may be encrypted to only be accessible to subscribers A, B, and C. If the access control policy is P and the revocation policy is P', then the total ABE policy may be represented as [P AND P']. Encrypting the payload generates a ciphertext, which the publisher publishes to the publish-subscribe network (Operation 414).

As discussed above, one or more intermediate nodes (i.e., nodes forwarding data from a publisher to one or more subscribers) may be configured to validate encrypted traffic against their own revocation records, to avoid forwarding ciphertexts that would be accessible to a revoked subscriber. When such validation fails, the publisher may receive a request to re-encrypt the payload using an updated revocation record (Operation 416). Responsive to the request, the publisher may re-encrypt the payload and re-publish the updated ciphertext (Operation 418).

Referring again to the example subscriber tree 300 illustrated in FIG. 3, Table 2 describes the different approaches for revoking subscribers in each subtree. In this example, the revocation policy for a given payload would be a combination of the revocation policies for all three subtrees. Table 2 further compares offline costs (ABE key storage for each subscriber) and online costs (ciphertext expansion to revoke) for subscribers in each subtree, where n is the total number of subscribers and r is the number of revoked subscribers:

TABLE 2

OFFLINE VS. ONLINE COST EXAMPLES

| | Low Likelihood | Medium Likelihood | High Likelihood |
|---|---|---|---|
| Revocation | Enumerate (n-r) non-revoked nodes, disjunction | Subset cover, disjunction | Enumerate NOT of r revoked nodes, conjunction |
| Cost ABE Key Size | Constant 1 | Logarithmic log(n) | Linear n |
| Ciphertext Size | (n − r) | $O\left(r \log\left(\frac{n}{r}\right)\right)$ | r |

As seen in Table 2, the ciphertext expansion (online cost) is greater to revoke a subscriber having a low likelihood of revocation than the online cost to revoke a subscriber having a high likelihood of revocation. Table 3 provides some non-limiting examples of ABE policies used to revoke particular subscribers:

TABLE 3

REVOCATION EXAMPLES

| Example | Revocation Policy | Policy Size/Cost |
|---|---|---|
| Revoke 1110 | "0" OR ~~1110~~ | $O(r)$ |
| Revoke 0110 | "00" OR ("010" OR "0111") OR "11" | $O\left(r\log\left(\frac{n_M}{r}\right)\right)$ |
| Revoke 0010 | ("0000" OR "0001" OR "0011") OR "01" OR "11" | $O(n_L)$ |

The examples in Table 3 illustrate how, for the subscriber tree 300 illustrated in FIG. 3, the online cost to revoke a high-likelihood subscriber is bounded by $O(r)$, the online cost to revoke a medium-likelihood subscriber is bounded by $$O\left(r\log\left(\frac{n_M}{r}\right)\right),$$

and the online cost to revoke a low-likelihood subscriber is bounded by $O(n_L)$, where $n_L$ is the number of ABE keys in the low-likelihood subtree, $n_M$ is the number of ABE keys in the medium-likelihood subtree, and $n_H$ is the number of ABE keys in the high-likelihood subtree. Adding a key to the high-risk subtree does not incur additional cost for the other categories.

In general, as described herein, techniques described herein allow for subscriber revocation without relying on ABE key expiration. Separating subscribers into subsets in a subscriber tree, according to likelihood of revocation, allows for balancing of tradeoffs between ABE key storage (offline cost) and ciphertext expansion (online cost) associated with revocation. Lower-likelihood subscribers may incur lower offline cost but higher online cost, while higher-likelihood subscribers may incur higher offline cost but lower online cost. Thus, one or more embodiments help preserve network bandwidth when revoking subscribers that were predetermined to have a high likelihood of revocation. In addition, techniques described herein allow for quick revocation, potentially avoiding unauthorized access by revoked subscribers that can occur when relying on time-based key revocation.

V. General; Computer Systems and Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 5:
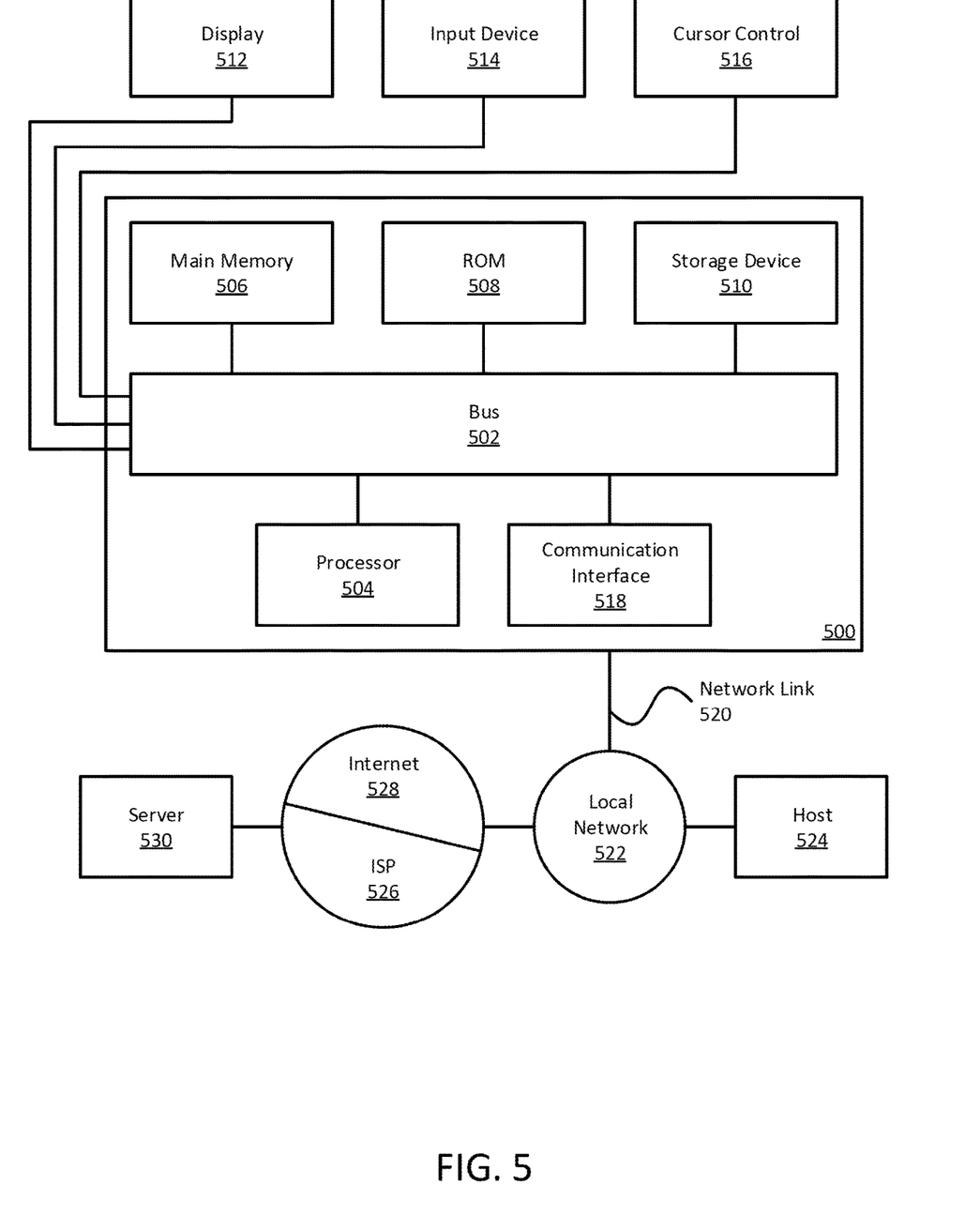
FIG. 5 is a block diagram of an example of a computer system according to an embodiment.

For example, FIG. 5 is a block diagram of an example of a computer system 500 according to an embodiment. Computer system 500 includes a bus 502 or other communication mechanism for communicating information, and a hardware processor 504 coupled with the bus 502 for processing information. Hardware processor 504 may be a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in one or more non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or additionally, computer system 500 may receive user input via a cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Alternatively or additionally, computer system 5 may include a touchscreen. Display 512 may be configured to receive user input via one or more pressure-sensitive sensors, multi-touch sensors, and/or gesture sensors. Alternatively or additionally, computer system 500 may receive user input via a microphone, video camera, and/or some other kind of user input device (not shown).

Computer system 500 may implement the techniques described herein using customized hard-wired logic, one or more ASICs or FPGAs, firmware, and/or program logic which in combination with other components of computer system 500 causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 500 may receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522, and communication interface 518.

The received code may be executed by processor 504 as it is received, and/or stored in storage device 510, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:
    generating a tree data structure comprising a plurality of leaf nodes representing a plurality of subscribers in a publish-subscribe network that uses attribute-based encryption (ABE), a plurality of subtrees of the tree data structure representing respective subsets of the plurality of subscribers having different likelihoods of ABE key revocation;
    generating a plurality of ABE keys associated with a plurality of edges in the tree data structure;
    assigning the plurality of ABE keys to the plurality of leaf nodes, each respective leaf node in the plurality of leaf nodes being assigned a subset of the plurality of ABE keys associated with a subset of the plurality of edges that forms a path from a root node of the tree data structure to the respective leaf node;
    based at least on a revocation record that indicates one or more revoked subscribers in the plurality of subscribers, determining a minimal subset of the plurality of ABE keys that covers all non-revoked subscribers in the plurality of subscribers;
    encrypting a payload using an encryption policy requiring at least one ABE key in the minimal subset of the plurality of ABE keys, to obtain a ciphertext that is not accessible to the one or more revoked subscribers;
    subscribing to a revocation channel in the publish-subscribe network;
    receiving, via the revocation channel, an instruction to revoke a particular subscriber in the plurality of subscribers; and
    updating the revocation record to identify the particular subscriber as revoked.

2. One or more non-transitory computer-readable media storing instructions that, when executed by one or more processors, cause the one or more processors to perform operations comprising:
    generating a tree data structure comprising a plurality of leaf nodes representing a plurality of subscribers in a publish-subscribe network that uses attribute-based encryption (ABE), a plurality of subtrees of the tree data structure representing respective subsets of the plurality of subscribers having different likelihoods of ABE key revocation;
    generating a plurality of ABE keys associated with a plurality of edges in the tree data structure;
    assigning the plurality of ABE keys to the plurality of leaf nodes, each respective leaf node in the plurality of leaf nodes being assigned a subset of the plurality of ABE keys associated with a subset of the plurality of edges that forms a path from a root node of the tree data structure to the respective leaf node;
    based at least on a revocation record that indicates one or more revoked subscribers in the plurality of subscribers, determining a minimal subset of the plurality of ABE keys that covers all non-revoked subscribers in the plurality of subscribers; and
    encrypting a payload using an encryption policy requiring at least one ABE key in the minimal subset of the plurality of ABE keys, to obtain a ciphertext that is not accessible to the one or more revoked subscribers;
    the plurality of subtrees of the tree data structure comprising at least a first subtree representing a first subset of subscribers having a first likelihood of ABE key revocation and a second subtree representing a second subset of subscribers having a second likelihood of ABE key revocation that is greater than the first likelihood, and
    the tree data structure and plurality of ABE keys being structured so that revocation of any subscriber represented by the first subtree requires greater ciphertext expansion than revocation of any subscriber represented by the second subtree.

3. The one or more non-transitory computer-readable media of claim 2, each subscriber represented by the second subtree being assigned one or more ABE keys indicating non-identity with every other subscriber represented by the second subtree.

4. The one or more non-transitory computer-readable media of claim 2,
    the plurality of subtrees of the tree data structure further comprising a third subtree representing a third subset of subscribers having a third likelihood of ABE key revocation that is greater than the first likelihood and less than the second likelihood, and
    the tree data structure and plurality of ABE keys being further configured so that revocation of any subscriber represented by the third subtree requires greater ciphertext expansion than revocation of any subscriber represented by the second subtree and less ciphertext expansion than revocation of any subscriber represented by the first subtree.

5. The one or more non-transitory computer-readable media of claim 1, the operations further comprising:
    receiving, responsive to publishing the ciphertext in the publish-subscribe network, a message indicating that the ciphertext is accessible to a revoked subscriber not indicated in the revocation record; and
    responsive to the message indicating that the revocation record is accessible to a revoked subscriber, re-encrypting the payload to obtain an updated ciphertext that is not accessible to the revoked subscriber.

6. The one or more non-transitory computer-readable media of claim 1, the encryption policy further requiring one or more ABE keys that excludes at least one of the non-revoked subscribers.

7. A device comprising:
    one or more processors; and
    one or more non-transitory machine-readable media storing instructions that, when executed by the one or more processors, cause the one or more processors to perform operations comprising:
        generating a tree data structure comprising a plurality of leaf nodes representing a plurality of subscribers in a publish-subscribe network that uses attribute-based encryption (ABE), a plurality of subtrees of the tree data structure representing respective subsets of the plurality of subscribers having different likelihoods of ABE key revocation;

generating a plurality of ABE keys associated with a plurality of edges in the tree data structure;

assigning the plurality of ABE keys to the plurality of leaf nodes, each respective leaf node in the plurality of leaf nodes being assigned a subset of the plurality of ABE keys associated with a subset of the plurality of edges that forms a path from a root node of the tree data structure to the respective leaf node;

based at least on a revocation record that indicates one or more revoked subscribers in the plurality of subscribers, determining a minimal subset of the plurality of ABE keys that covers all non-revoked subscribers in the plurality of subscribers;

encrypting a payload using an encryption policy requiring at least one ABE key in the minimal subset of the plurality of ABE keys, to obtain a ciphertext that is not accessible to the one or more revoked subscribers;

subscribing to a revocation channel in the publish-subscribe network;

receiving, via the revocation channel, an instruction to revoke a particular subscriber in the plurality of subscribers; and updating the revocation record to identify the particular subscriber as revoked.

8. A device comprising:
one or more processors; and
one or more non-transitory machine-readable media storing instructions that, when executed by the one or more processors, cause the one or more processors to perform operations comprising:
generating a tree data structure comprising a plurality of leaf nodes representing a plurality of subscribers in a publish-subscribe network that uses attribute-based encryption (ABE), a plurality of subtrees of the tree data structure representing respective subsets of the plurality of subscribers having different likelihoods of ABE key revocation;

generating a plurality of ABE keys associated with a plurality of edges in the tree data structure;

assigning the plurality of ABE keys to the plurality of leaf nodes, each respective leaf node in the plurality of leaf nodes being assigned a subset of the plurality of ABE keys associated with a subset of the plurality of edges that forms a path from a root node of the tree data structure to the respective leaf node;

based at least on a revocation record that indicates one or more revoked subscribers in the plurality of subscribers, determining a minimal subset of the plurality of ABE keys that covers all non-revoked subscribers in the plurality of subscribers; and encrypting a payload using an encryption policy requiring at least one ABE key in the minimal subset of the plurality of ABE keys, to obtain a ciphertext that is not accessible to the one or more revoked subscribers;

the plurality of subtrees of the tree data structure comprising at least a first subtree representing a first subset of subscribers having a first likelihood of ABE key revocation and a second subtree representing a second subset of subscribers having a second likelihood of ABE key revocation that is greater than the first likelihood, and the tree data structure and plurality of ABE keys being structured so that revocation of any subscriber represented by the first subtree requires greater ciphertext expansion than revocation of any subscriber represented by the second subtree.

9. The device of claim 8, each subscriber represented by the second subtree being assigned one or more ABE keys indicating non-identity with every other subscriber represented by the second subtree.

10. The device of claim 8,
the plurality of subtrees of the tree data structure further comprising a third subtree representing a third subset of subscribers having a third likelihood of ABE key revocation that is greater than the first likelihood and less than the second likelihood, and the tree data structure and plurality of ABE keys being further configured so that revocation of any subscriber represented by the third subtree requires greater ciphertext expansion than revocation of any subscriber represented by the second subtree and less ciphertext expansion than revocation of any subscriber represented by the first subtree.

11. The device of claim 7, the operations further comprising:
receiving, responsive to publishing the ciphertext in the publish-subscribe network, a message indicating that the ciphertext is accessible to a revoked subscriber not indicated in the revocation record; and responsive to the message indicating that the revocation record is accessible to a revoked subscriber, re-encrypting the payload to obtain an updated ciphertext that is not accessible to the revoked subscriber.

12. The device of claim 7, the encryption policy further requiring one or more ABE keys that excludes at least one of the non-revoked subscribers.

13. A method comprising:
generating a tree data structure comprising a plurality of leaf nodes representing a plurality of subscribers in a publish-subscribe network that uses attribute-based encryption (ABE), a plurality of subtrees of the tree data structure representing respective subsets of the plurality of subscribers having different likelihoods of ABE key revocation;

generating a plurality of ABE keys associated with a plurality of edges in the tree data structure;

assigning the plurality of ABE keys to the plurality of leaf nodes, each respective leaf node in the plurality of leaf nodes being assigned a subset of the plurality of ABE keys associated with a subset of the plurality of edges that forms a path from a root node of the tree data structure to the respective leaf node;

based at least on a revocation record that indicates one or more revoked subscribers in the plurality of subscribers, determining a minimal subset of the plurality of ABE keys that covers all non-revoked subscribers in the plurality of subscribers; and encrypting a payload using an encryption policy requiring at least one ABE key in the minimal subset of the plurality of ABE keys, to obtain a ciphertext that is not accessible to the one or more revoked subscribers;

subscribing to a revocation channel in the publish-subscribe network;

receiving, via the revocation channel, an instruction to revoke a particular subscriber in the plurality of subscribers; and updating the revocation record to identify the particular subscriber as revoked.

14. A method comprising:
generating a tree data structure comprising a plurality of leaf nodes representing a plurality of subscribers in a publish-subscribe network that uses attribute-based encryption (ABE), a plurality of subtrees of the tree data structure representing respective subsets of the plurality of subscribers having different likelihoods of ABE key revocation;

generating a plurality of ABE keys associated with a plurality of edges in the tree data structure;

assigning the plurality of ABE keys to the plurality of leaf nodes, each respective leaf node in the plurality of leaf nodes being assigned a subset of the plurality of ABE keys associated with a subset of the plurality of edges that forms a path from a root node of the tree data structure to the respective leaf node;

based at least on a revocation record that indicates one or more revoked subscribers in the plurality of subscribers, determining a minimal subset of the plurality of ABE keys that covers all non-revoked subscribers in the plurality of subscribers; and encrypting a payload using an encryption policy requiring at least one ABE key in the minimal subset of the plurality of ABE keys, to obtain a ciphertext that is not accessible to the one or more revoked subscribers;

the plurality of subtrees of the tree data structure comprising at least a first subtree representing a first subset of subscribers having a first likelihood of ABE key revocation and a second subtree representing a second subset of subscribers having a second likelihood of ABE key revocation that is greater than the first likelihood, and the tree data structure and plurality of ABE keys being structured so that revocation of any subscriber represented by the first subtree requires greater ciphertext expansion than revocation of any subscriber represented by the second subtree.

15. The method of claim 14, each subscriber represented by the second subtree being assigned one or more ABE keys indicating non-identity with every other subscriber represented by the second subtree.

16. The method of claim 14, the plurality of subtrees of the tree data structure further comprising a third subtree representing a third subset of subscribers having a third likelihood of ABE key revocation that is greater than the first likelihood and less than the second likelihood, and the tree data structure and plurality of ABE keys being further configured so that revocation of any subscriber represented by the third subtree requires greater ciphertext expansion than revocation of any subscriber represented by the second subtree and less ciphertext expansion than revocation of any subscriber represented by the first subtree.

17. The method of claim 13, further comprising:

receiving, responsive to publishing the ciphertext in the publish-subscribe network, a message indicating that the ciphertext is accessible to a revoked subscriber not indicated in the revocation record; and responsive to the message indicating that the revocation record is accessible to a revoked subscriber, re-encrypting the payload to obtain an updated ciphertext that is not accessible to the revoked subscriber.

* * * * *